(12) United States Patent
Kitami et al.

(10) Patent No.: US 9,203,233 B2
(45) Date of Patent: Dec. 1, 2015

(54) AUTOMOBILE HAVING ELECTRIC VEHICLE DRIVE MOTOR

(75) Inventors: Akio Kitami, Toyota (JP); Tatsuyuki Uechi, Toyoake (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 76 days.

(21) Appl. No.: 14/237,392

(22) PCT Filed: Aug. 6, 2012

(86) PCT No.: PCT/IB2012/001496
§ 371 (c)(1),
(2), (4) Date: Feb. 6, 2014

(87) PCT Pub. No.: WO2013/021256
PCT Pub. Date: Feb. 14, 2013

(65) Prior Publication Data
US 2014/0151138 A1 Jun. 5, 2014

(30) Foreign Application Priority Data
Aug. 9, 2011 (JP) .................................. 2011-174376

(51) Int. Cl.
*H02H 5/00* (2006.01)
*B60L 3/04* (2006.01)
(Continued)

(52) U.S. Cl.
CPC .. *H02H 5/00* (2013.01); *B60K 1/04* (2013.01); *B60K 6/20* (2013.01); *B60L 1/00* (2013.01); *B60L 1/003* (2013.01); *B60L 3/0061* (2013.01); *B60L 3/04* (2013.01); *B60L 11/08* (2013.01);
(Continued)

(58) Field of Classification Search
CPC ...... H02H 5/00; B60K 1/04; B60K 2028/006; B60K 6/20; B60K 6/22; B60L 3/04; B60L 3/0061; B60L 11/08; B60L 11/12; B60L 11/14; B60L 11/1868; B60L 11/00; B60L 1/003; B60L 1/00; B60L 2210/10; B60L 2210/40; B60R 16/04; B60R 16/0215; Y10S 903/903; Y10S 903/951; Y02T 10/7077; Y02T 10/7005; Y02T 10/7241; Y02T 10/7066; Y02T 10/7216; B60Y 2400/61; H02G 3/14
See application file for complete search history.

(56) References Cited

U.S. PATENT DOCUMENTS 5,897,392 A * 4/1999 Takahashi et al. ............ 439/470
6,460,642 B1 * 10/2002 Hirano .......................... 180/65.1
(Continued)

FOREIGN PATENT DOCUMENTS

DE 4027147 A1 * 3/1992 ............... B60K 1/00
JP 2050-152470 5/2000
(Continued)

*Primary Examiner* — Paul N Dickson
*Assistant Examiner* — Steve Clemmons
(74) *Attorney, Agent, or Firm* — Finnegan, Henderson, Farabow, Garrett & Dunner, LLP

(57) ABSTRACT

An automobile includes: a controller for controlling a motor; a main battery for supplying electric power to the motor via the controller; a normally open relay interposed in an electric power supply path extending from the main battery to the controller; and a sub-battery for supplying the electric power to the relay. The controller is mounted with a terminal cover that covers an output terminal for connection with a power supply cable to the motor. The sub-battery is disposed adjacent to the controller so as to interfere with the removal of the terminal cover by a worker.

6 Claims, 8 Drawing Sheets

(51) Int. Cl.
*B60L 1/00* (2006.01)
*B60L 11/08* (2006.01)
*B60L 11/12* (2006.01)
*B60L 3/00* (2006.01)
*B60L 11/14* (2006.01)
*B60L 11/18* (2006.01)
*B60K 1/04* (2006.01)
*B60K 6/20* (2007.10)
*B60R 16/04* (2006.01)
*B60K 28/00* (2006.01)
*B60R 16/02* (2006.01)
*H02K 5/22* (2006.01)
*H02G 3/14* (2006.01)

(52) U.S. Cl.
CPC ............ *B60L 11/12* (2013.01); *B60L 11/14* (2013.01); *B60L 11/1868* (2013.01); *B60R 16/04* (2013.01); *B60K 2028/006* (2013.01); *B60L 2210/10* (2013.01); *B60L 2210/40* (2013.01); *B60R 16/0215* (2013.01); *B60Y 2400/61* (2013.01); *H02G 3/14* (2013.01); *H02K 5/225* (2013.01); *Y02T 10/7005* (2013.01); *Y02T 10/7066* (2013.01); *Y02T 10/7077* (2013.01); *Y02T 10/7216* (2013.01); *Y02T 10/7241* (2013.01); *Y10S 903/903* (2013.01); *Y10S 903/951* (2013.01)

(56) References Cited

U.S. PATENT DOCUMENTS

| | | | | |
|---|---|---|---|---|
| 6,827,168 | B2 * | 12/2004 | Miyazaki | 180/68.5 |
| 7,468,565 | B2 * | 12/2008 | Hoshiba | 307/10.1 |
| 7,485,983 | B2 * | 2/2009 | Asao et al. | 307/10.1 |
| 8,960,355 | B2 * | 2/2015 | Matsuda | 180/220 |
| 2009/0253018 | A1 * | 10/2009 | Matsubara et al. | 429/34 |
| 2010/0120581 | A1 * | 5/2010 | Mitsutani et al. | 477/7 |
| 2010/0127565 | A1 * | 5/2010 | Fukazu et al. | 307/9.1 |
| 2010/0248008 | A1 * | 9/2010 | Sugawara et al. | 429/159 |

FOREIGN PATENT DOCUMENTS

| | | |
|---|---|---|
| JP | 2002-315216 | 10/2002 |
| JP | 2005-143200 | 6/2005 |
| JP | 2010-36594 | 2/2010 |
| JP | 2010158991 A * | 7/2010 |
| JP | 2010264793 A * | 11/2010 |
| JP | 2010-269658 | 12/2010 |
| JP | 2012-158312 | 8/2012 |
| JP | 2013-138570 | 7/2013 |
| WO | WO 2012/104721 A1 | 8/2012 |
| WO | WO 2012/160618 A1 | 11/2012 |

* cited by examiner

AUTOMOBILE HAVING ELECTRIC VEHICLE DRIVE MOTOR

CROSS-REFERENCE TO RELATED APPLICATIONS

This application is a national phase application of International Application No. PCT/IB2012/001496, filed Aug. 6, 2012, and claims the priority of Japanese Application No. 2011-174376, filed Aug. 9, 2011, the content of both of which is incorporated herein by reference.

BACKGROUND OF THE INVENTION

1. Field of the Invention

The present invention relates to an automobile having a vehicle drive motor (traction motor). More particularly, the present invention relates to an electric vehicle including a hybrid vehicle. It is noted that the term "automobile" used herein also includes a fuel cell vehicle.

2. Description of Related Art

A vehicle drive motor for use in electric vehicles is normally driven by a high voltage equal to or more than 100V. An output of a main battery for supplying electric power to the vehicle drive motor also has a high voltage equal to or more than 100V. The electric power of the main battery is transmitted to a controller of the vehicle drive motor. In the controller, a DC electric power is converted into an AC electric power and the AC electric power is then supplied to the motor. The controller is normally mounted in a compartment of the automobile (front compartment/engine compartment). The controller for supplying electric drive power to the motor and controlling the motor may be sometimes called "power control unit." Unless otherwise stated herein, the vehicle drive motor is referred to simply as "motor," and the controller for supplying the electric drive power to the motor and controlling the motor is referred to simply as "controller."

There may be a case where the controller is removed from the compartment when maintenance is performed on an automobile. First of all, a power cable connected to an input terminal for receiving power supply from the main battery or an output terminal for power supply to the motor must be removed to allow the removal of the controller. Hereinafter, normal voltage (electric power) of 100V or more for driving the motor will be referred to as "high voltage (high-voltage electric power)" and the input terminal/output terminal for connection with high-voltage electric power line will be referred to as "high-voltage terminal." The high-voltage terminal is normally covered with a terminal cover for safety purpose. In the removal of the controller, the supply of high-voltage electric power to the controller should be normally cut off. However, it is preferred that the terminal cover is provided with an interlock for ensuring more positive safety of a worker. The term "interlock" used herein means a switch that cuts off an electric power supply path from the main battery to the controller in response to the removal of the terminal cover. In general, the term "interlock" means a contrivance to ensure the safety of the worker or a device, namely a contrivance to disable the device unless a predetermined condition is established. The interlock stated herein is a contrivance that is triggered by the removal of the terminal cover to cut off a high-voltage electric power supply path from the main battery to the controller. An example of such an interlock is disclosed in Japanese Patent Application No. 2005-143200 (JP-2005-143200 A). JP-2005-143200 A discloses the interlock operatively connected with the release of the terminal cover.

SUMMARY OF THE INVENTION

Similar to the technique disclosed in JP-2005-143200 A, the interlock adapted to cut off the electric power supply path in response to the removal of the cover (terminal cover) generally includes a switch in which contacts are physically opened by the removal of the cover. Such a switch is often mounted to the cover itself. For example, an embodiment of such a switch includes a metal sheet attached to the inside of the cover and is configured such that when the cover is mounted to a device, the metal sheet of the cover interconnects two contacts disposed at the device (electrical conduction between the two contacts) and such that the two contacts are electrically disconnected when the cover is removed. Another embodiment of such a switch includes a pin disposed on a back side of the cover and is configured such that when the cover is mounted to the device, the pin presses down the switch mounted to the device so as to close the switch (electrical conduction) and such that when the cover is removed, the pin is removed so as to open the switch. In either case, the cover needs to include a part of the interlock. Namely, it is required to incorporate a part of the interlock in the terminal cover. The present invention provides an automobile equipped with an interlock that can be implemented in a simple structure by taking advantage of characteristics of a structure of an electric system of the automobile and that obviates the need for incorporating a part of the interlock in the terminal cover for the controller.

An automobile according to an aspect of the invention includes: a controller that controls a motor for driving the automobile; a main battery that supplies electric power to the motor via the controller; a relay that is interposed in an electric power supply path extending from the main battery to the controller and that is normally open; and a sub-battery that supplies electric power to the relay. The controller is provided with an input terminal that connects with a power supply cable from the main battery or an output terminal that connects with a power supply cable to the motor, and is mounted with a terminal cover that covers the input terminal or the output terminal. The sub-battery is disposed adjacent to the controller to interfere with a removal of the terminal cover. As is well known in the field of the electric circuit technology, the normally open relay is a switch that keeps its contacts closed while being supplied with the electric power and that opens its contacts when the power supply is cut off. The phrase "supply the electric power to the relay" means more exactly that the electric power is supplied to a device (electromagnetic coil) that closes the contacts of the relay. The controller is provided with the input terminal that connects with the power supply cable from the main battery and/or the output terminal that connects with the power supply cable to the motor. Further, the controller is mounted with the terminal cover that covers the input terminal and the output terminal. The sub-battery is disposed adjacent to the controller in a manner to interfere with the removal of the terminal cover by a worker. Hereinafter, the above relay will be referred to as "system main relay." It is noted that the term "sub-battery" is used for distinction from the main battery that supplies the electric power to the motor. In some cases, the sub-battery may also be referred to as ancillary battery, accessory battery or auxiliary battery.

In the above automobile, the sub-battery must be first removed to allow the removal of the controller from the engine compartment. When the sub-battery is removed, namely wire connection with the output terminal of the sub-battery is removed, the system main relay cuts off the electric power supply path from the main battery. This ensures that a path for supplying the high-voltage electric power to the controller is cut off. In the above automobile, a layout of the sub-battery to the controller per se constitutes the interlock. The above automobile obviates the need for incorporating the interlock in the terminal cover. Further, a mechanism of the interlock itself can be easily implemented because the layout of the sub-battery constitutes the interlock.

The sub-battery may be disposed in a manner to cover the whole body of the terminal cover or in a manner to cover a part of the terminal cover. In the above automobile, the sub-battery may be disposed so as to overlap with a fastening member that fixes the terminal cover to the controller. If the sub-battery is disposed in the above-described manner, it is assured that the removal of the terminal cover always requires the removal of the sub-battery. The fastening member may typically include, but not limited to, bolts or nuts. For example, the fastening member may be a snap-fit retainer or hook.

The invention is not limited to the aspect in which the sub-battery directly covers the terminal cover. Since the controller that controls the motor is a crucial part, the controller may sometimes be equipped with a protector (made of metal sheet) that protects the controller from impact. In the automobile according to an aspect of the invention, the protector that protects the controller from impact may be mounted to the controller in a manner to cover the terminal cover, while the sub-battery may be disposed adjacent to the controller so as to interfere with the removal of the protector. That is, the above automobile may include the protector that covers the terminal cover, and the sub-battery may be disposed adjacent to the controller to interfere with a removal of the protector.

In the above automobile, the controller may be fixed to a drive train, and the sub-battery may be fixed to a frame of the automobile.

The sub-battery may be disposed on one side of a drive train, and an engine may be disposed on the opposite side of the drive train.

The above automobile may further include an interlock circuit in which the relay is turned off by a removal of the sub-battery, and the interlock circuit may be configured to turn off the relay upon detection of an abnormality of a drive power source for the automobile.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
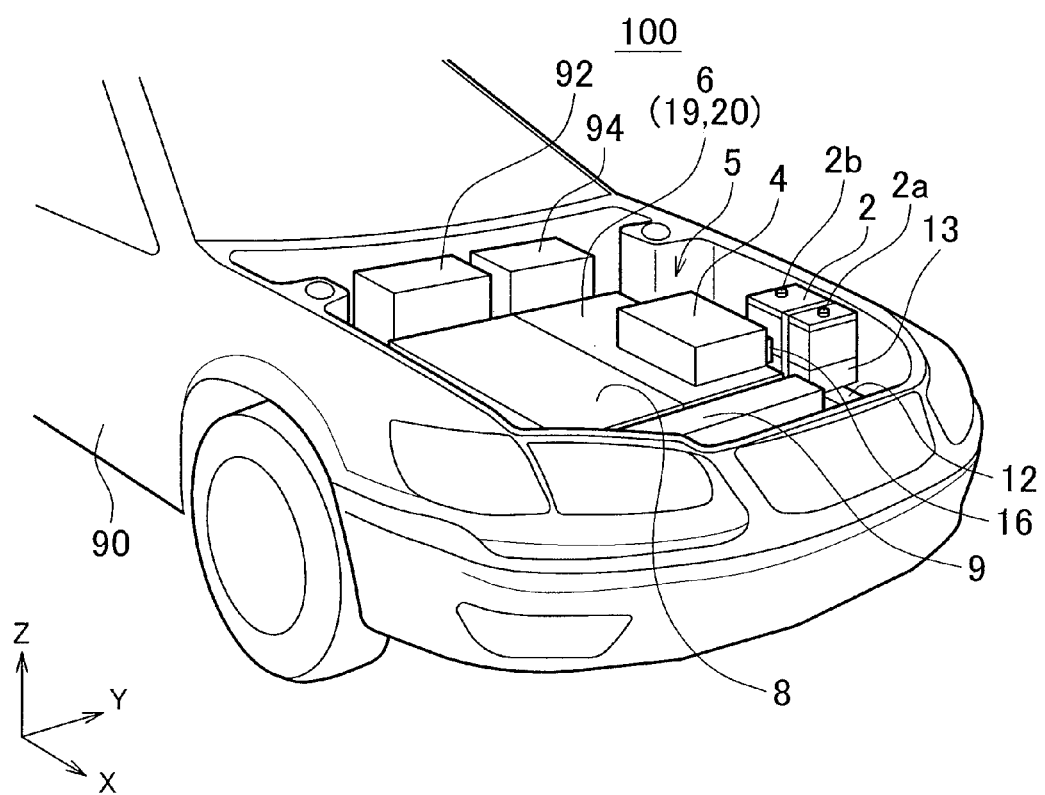
FIG. 1 is a perspective view showing a device layout in a front compartment of an automobile according to a first embodiment of the invention.
Figure 2:
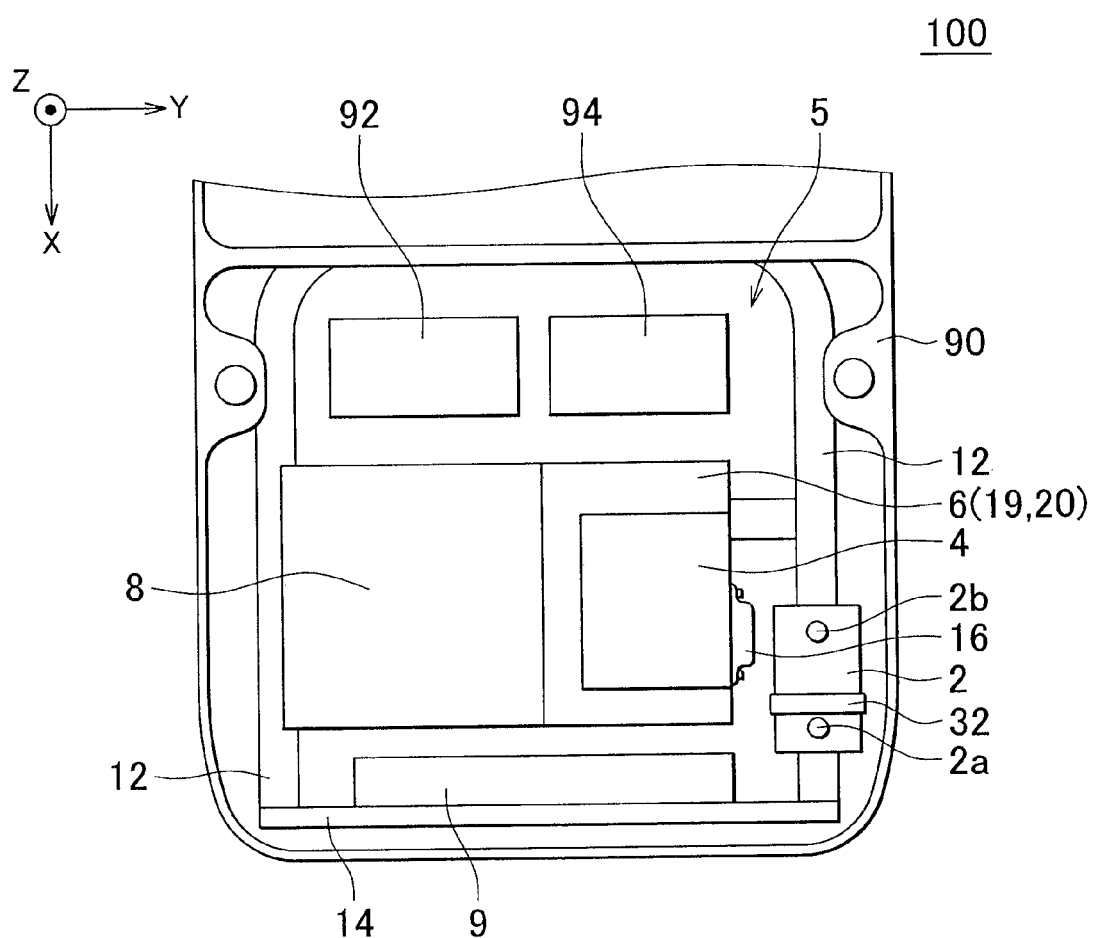
FIG. 2 is a plan view showing the device layout in the front compartment of the automobile according to the first embodiment.

An automobile according to a first embodiment of the invention is described with reference to the accompanying drawings. A vehicle 100 of the first embodiment is a hybrid vehicle including both an engine 8 and a motor 19 (vehicle drive motor). The engine 8 and the motor 19 are mounted in a front compartment 5. FIG. 1 shows an interior of the front compartment in perspective. FIG. 2 shows the interior of the front compartment in plan. In a coordinate system shown in the drawings, the X-axis corresponds to the forward direction of the vehicle, the Y-axis corresponds to the transverse direction thereof, and the Z-axis corresponds to the upward direction (vertically upward direction) thereof. The same applies to the other drawings.

Principal devices mounted in the front compartment 5 include: the engine 8; a drive train 6 including the motor 19, a transmission 20 and a differential case; a sub-battery 2; a radiator 9; and a controller 4 (also referred to as power control unit) for controlling the motor 19. Other devices include: a relay box 92 and a compressor 94 of an air conditioner. The engine 8 and the drive train 6 are fixed to a side frame 12 (side member) forming a frame of the vehicle. The radiator 9 is fixed to a front frame 14 (front bumper reinforcement) forming a part of the frame. A vehicle body 90 is also supported by the side frame 12 and the front frame 14. The sub-battery 2 is fixed to the side frame 12 via a spacer 13. The sub-battery 2 is fixed to place with a belt 32. The drawings do not depict wire connection between output terminals 2a, 2b of the sub-battery 2 and other devices. The negative terminal 2a of the sub-battery 2 is connected as a ground to the body 90 (the frames 12, 14). Reference numeral 16 in FIG. 2 represents a terminal cover for covering output terminals for power supply to the motor 19.

As is well known in the art, the hybrid vehicle switches from the engine 8 to the motor 19 or vice versa depending upon the conditions. When requiring a large torque, the hybrid vehicle uses both the engine 8 and the motor 19 simultaneously. The transmission 20 in the drive train 6 switches between an output from the engine 8 and an output from the motor 19 or otherwise, combines these outputs, and transmits the resultant output to the differential case. In some cases, the drive train 6 may also be called power train or transaxle. A detailed description on the structure of the drive train 6 is dispensed with. The motor 19 also serves as a generator adapted to convert a braking energy (regenerative energy), derived from braking, to electric energy.

In the embodiment, a battery for supplying a high-voltage electric power for driving the motor 19 is referred to as "main battery" for the purpose of distinction from the sub-battery 2. The sub-battery 2 is a power source for supplying a low-voltage electric power for driving electric circuits, headlights, a car room light, power window motors, wiper motors and the like. The main battery normally supplies power of 50V or more, while the sub-battery normally supplies power of less than 50V. The output voltage of many main batteries is on the order of 100V to 300V, while the output voltage of many sub-batteries is 12V or 24V. Rechargeable lead-acid batteries employing lead as electrode are often used as the sub-battery 2. On the other hand, nickel-cadmium batteries and lithium-ion batteries are often used as the main battery. An intensive study has also been made on the use of fuel cell as the main battery. The sub-battery 2 is disposed in the front compartment 5. However, the main battery is not disposed in the front compartment 5 but in a rear compartment (luggage room) or under a rear seat.

The controller 4 controls the motor 19. The controller 4 is supplied with an electric power (DC voltage) from the main battery and converts the battery voltage to a suitable voltage for driving the motor. Then, the controller 4 converts the voltage to an AC voltage and supplies the resultant voltage to the motor 19. Specifically, the controller 4 incorporates therein a DC-DC converter for converting a DC current from one voltage level to another, and an inverter for converting a DC current into an AC current. As described above, the output voltage of the main battery is in the range of 100V to 300V. The DC-DC converter boosts the output voltage to 400V to 600V. The DC-DC converter and the inverter handle higher voltages (50V or more) than the output from the sub-battery. The controller 4 is fixed on the drive train 6.

As described above, the controller 4 handles the high-voltage electric power. The controller 4 may sometimes be removed from the vehicle 100 for vehicle maintenance work or the like. Hence, some kind of safety circuit, namely an interlock is required for ensuring that a path for supplying the high-voltage electric power from the main battery is cut off when the worker treats the controller 4. The vehicle 100 has the sub-battery 2 disposed in such a manner that the worker cannot access an output terminal of the controller 4 (an output terminal for connection with a power supply cable to the motor 19) unless the sub-battery 2 is removed from the front compartment 5. The vehicle 100 is configured such that the removal of the sub-battery 2 (to be exact, the removal of the wire connection with the output terminal of the sub-battery 2) triggers the interlock operation. Next, description is made on a layout of the controller 4 and the sub-battery 2 and a positional relation between the terminal cover 16 for covering the output terminals and the sub-battery 2. The negative terminal 2a (ground) of the sub-battery 2 is connected to the side frame 12 (front frame 14) of the vehicle 100, while the positive terminal 2b of the sub-battery 2 is connected to a variety of devices including the controller 4. It is noted that the drawings except for FIG. 6 do not depict the interconnections therebetween.

Figure 3:
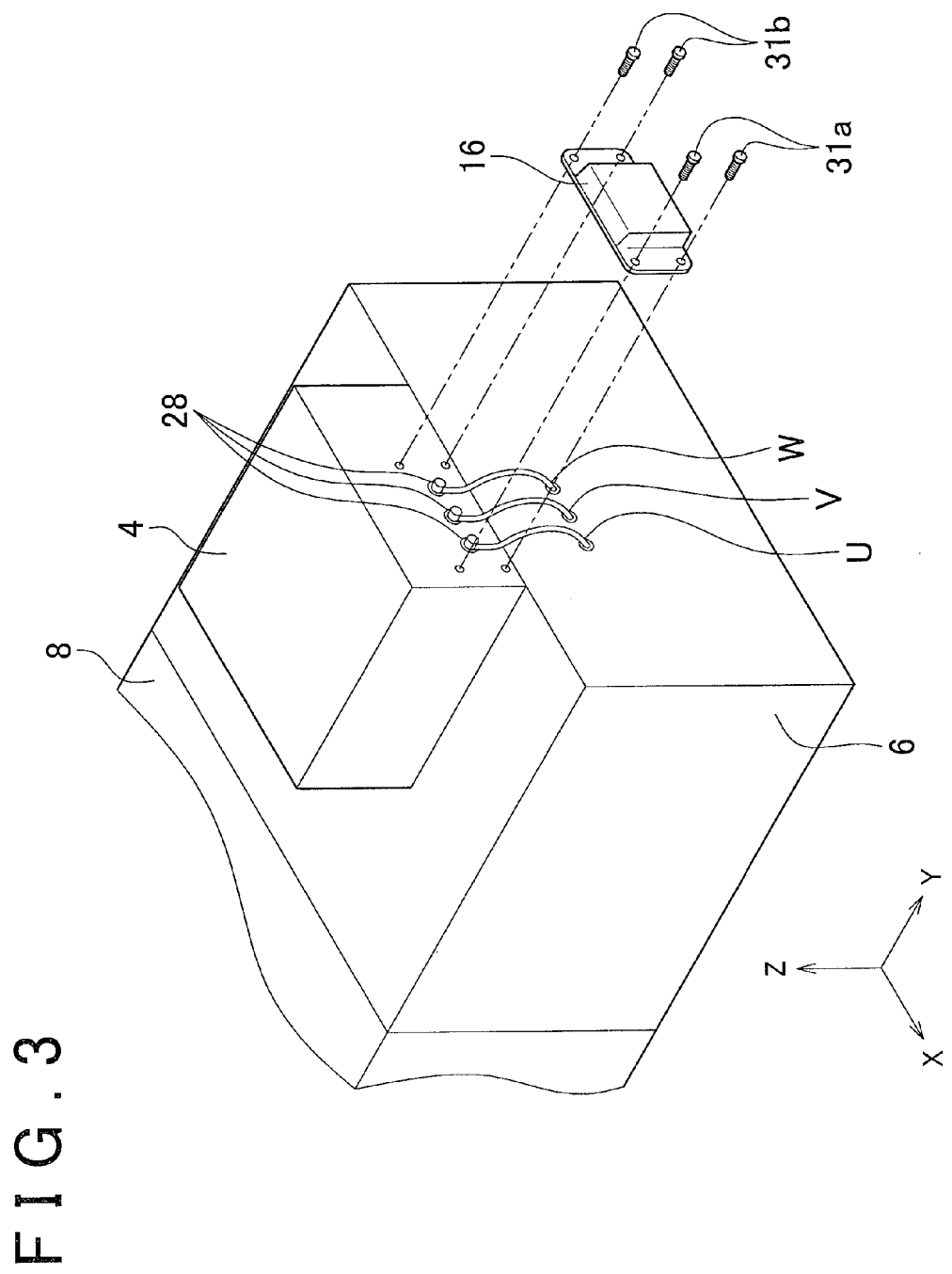
FIG. 3 is a perspective view showing a controller with a terminal cover removed therefrom.
Figure 4:
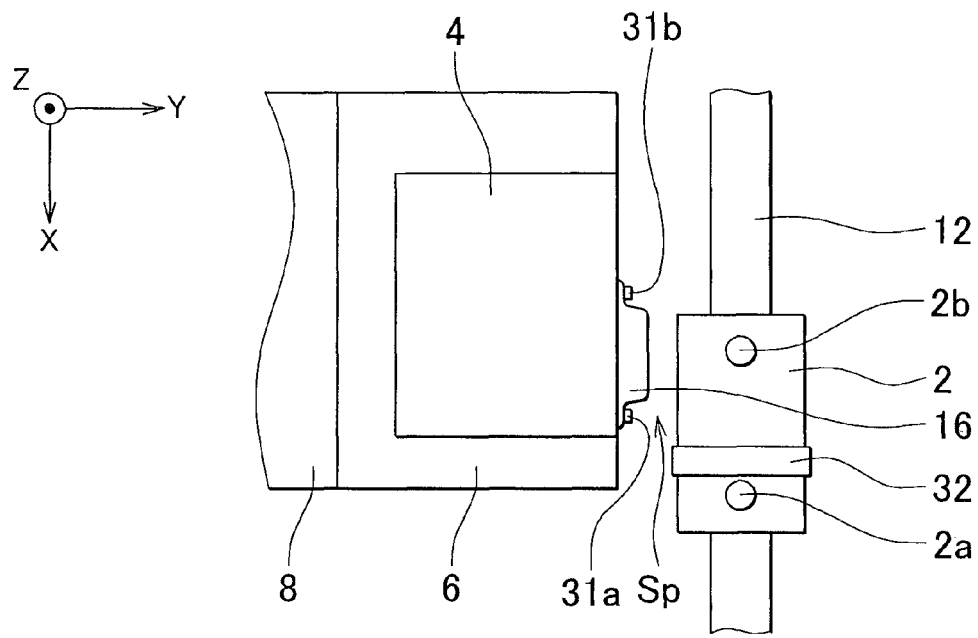
FIG. 4 is a plan view showing a layout of the controller and a sub-battery.
Figure 5:
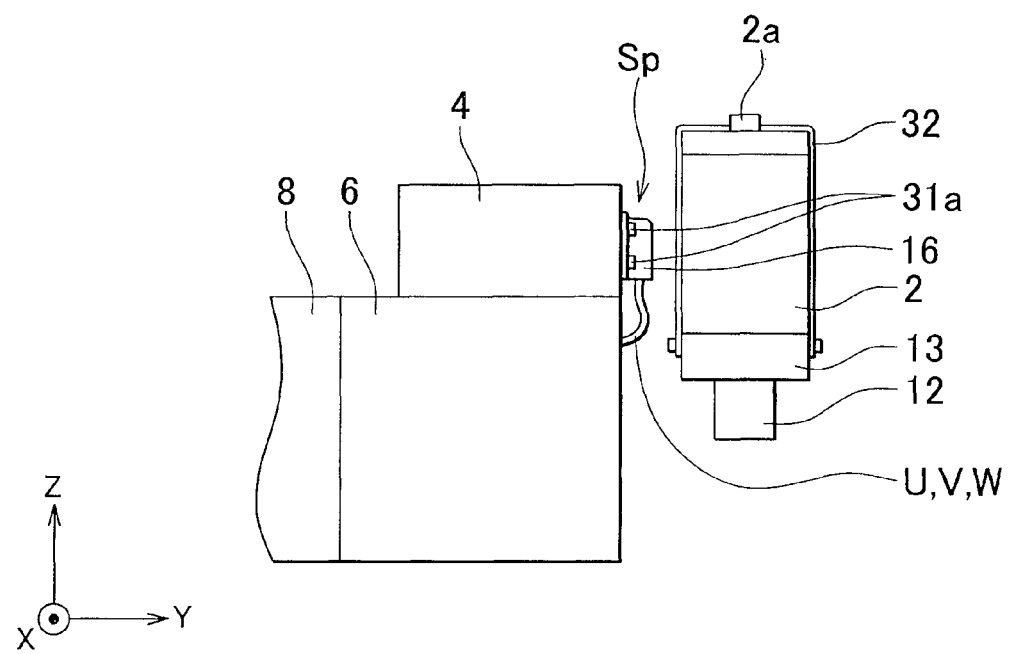
FIG. 5 is a front view showing the layout of the controller and the sub-battery.
Figure 6:
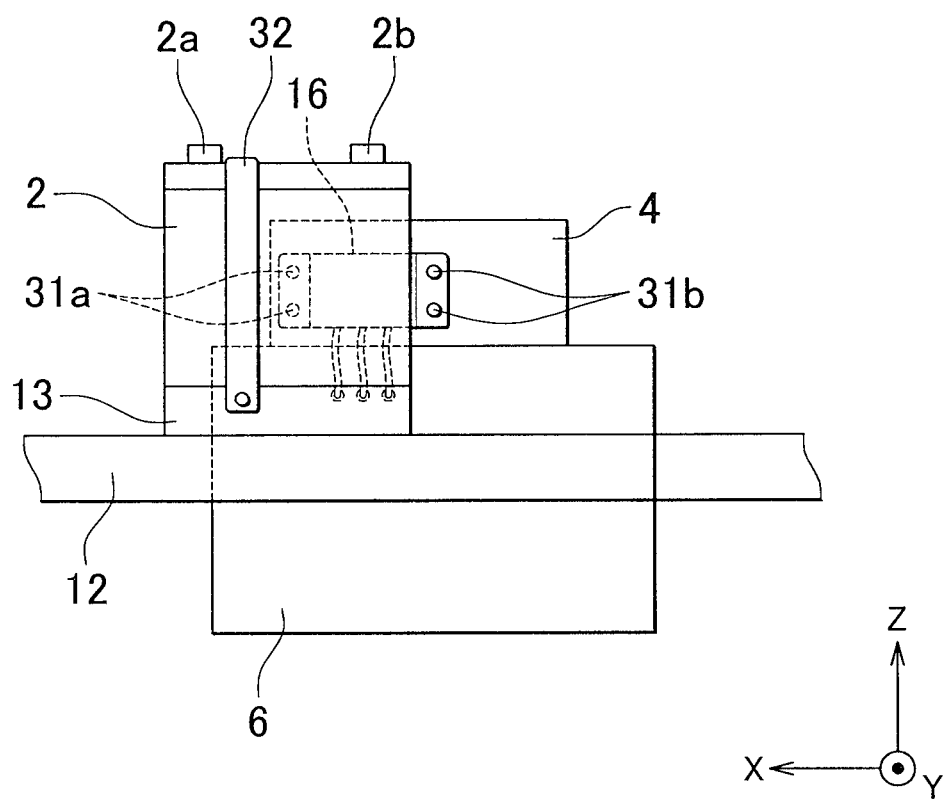
FIG. 6 is a side view showing the layout of the controller and the sub-battery.

FIG. 3 is a perspective view of the controller 4 (with the terminal cover 16 removed therefrom). FIG. 4, FIG. 5 and FIG. 6 show the layout of the controller 4 and the sub-battery 2 in plan view (as viewed along the Z-axis), front view (as viewed along the X-axis) and side view (as viewed along the Y-axis), respectively. As shown in FIG. 3, the output terminals 28 are disposed on a side surface of the controller 4. The output terminal 28 is a terminal for connection with a cable for supplying the electric drive power to the motor 19. More specifically, the output terminal 28 is equivalent to an output terminal of the inverter incorporated in the controller 4. The three output terminals 28 are equivalent to a U-phase AC terminal, a V-phase AC terminal and a W-phase AC terminal, respectively. The three output terminals 28 are each connected with one end of the cable, the other end of which is connected to the motor. The terminal cover 16 covering the output terminals 28 is fixed to the side surface of the controller 4 with four bolts 31a, 31b. In other words, the controller 4 is provided with the output terminals 28 on the side surface of the controller 4, and has the terminal cover 16 mounted to the controller 4 in a manner to cover the output terminals 28. It is noted that reference numeral 31a in the drawing represents two bolts for fastening a front side of the terminal cover 16 and reference numeral 31b in the drawing represents two bolts for fastening a rear side of the terminal cover 16.

As shown in FIG. 4 to FIG. 6, the sub-battery 2 is disposed adjacent to the controller 4. More specifically, the sub-battery 2 is disposed in a manner to overlap with a part of the terminal cover 16. As shown in FIG. 6, the sub-battery 2 does not cover the bolts 31b fastening the rear side of the terminal cover 16 but covers the bolts 31a fastening the front side of the terminal cover 16. A space Sp between the sub-battery 2 and the controller 4 (space Sp between the sub-battery 2 and the terminal cover 16) is too small for the worker to remove the bolt 31a. That is, the terminal cover 16 cannot be removed without removing the sub-battery 2. In other words, the sub-battery 2 is disposed at a place adjacent to the controller 4 so as to interfere with the removal of the terminal cover 16. In yet other words, the sub-battery 2 is disposed in a manner to cover the bolts 31a so as to inhibit the worker from removing the bolts 31a fastening, the terminal cover 16 to the controller 4. To put it the other way around, there is a need for removing the sub-battery 2 out of the front compartment 5 before removing the terminal cover 16.

As seen from FIG. 1 to FIG. 6, the sub-battery 2 is disposed on one side of the drive train 6 (the right side of the drive train 6 as seen in FIG. 2), while the engine 8 is disposed on the opposite side of the drive train 6 to the sub-battery 2 (the left side of the drive train 6 as seen in FIG. 2). The operation of removing the sub-battery 2 is facilitated by locating the sub-battery 2 on the opposite side to the engine 8.

The wire connection with the output terminals 2a, 2b must be removed to remove the sub-battery 2. The vehicle 100 is adapted to cut off the path for supplying the high-voltage electric power from the main battery to the controller 4 in response to the removal of (at least one of) the output terminals 2a, 2b of the sub-battery 2. Next, description is made on the interlock system.

Figure 7:
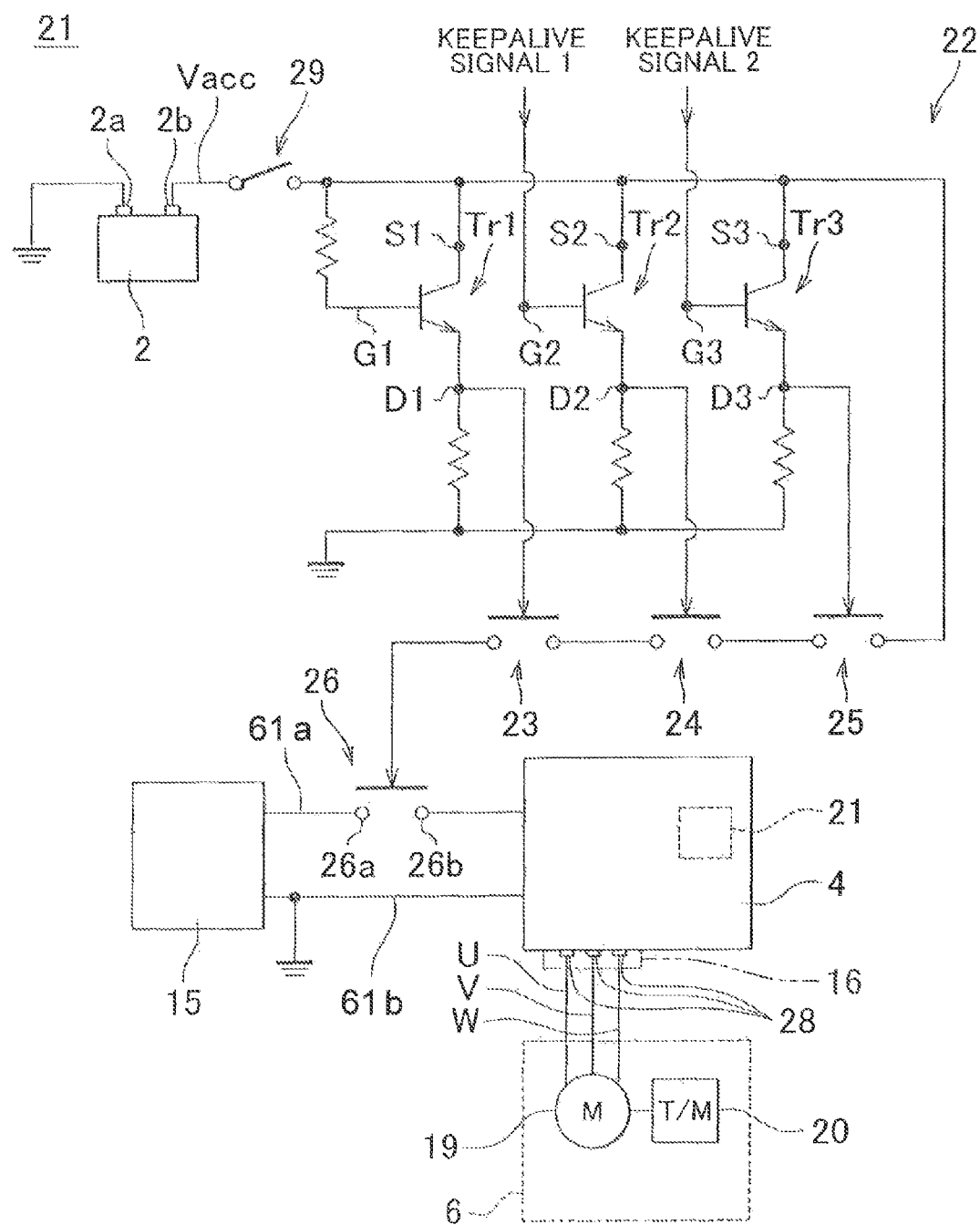
FIG. 7 shows a circuit diagram of an interlock.

FIG. 7 shows a circuit diagram of an interlock system 21 operative to cut off the path for supplying the high-voltage electric power from a main battery 15 to the controller 4. The interlock system 21 includes: a main relay 26 interposed in the electric power supply path from the main battery 15 to the controller 4; and an interlock circuit 22. Specifically, the main relay 26 is interposed in a power cable 61a interconnecting the main battery 15 and the controller 4. The main relay 26 is interposed in the power cable 61a from a positive electrode of the main battery 15. A power cable 61b from a negative electrode of the main battery 15 always keeps the main battery 15 and the controller 4 in connection and is also connected to the ground. The main relay 26 may also be interposed between the power cable 61a and an output terminal of the main battery 15. A substrate forming the interlock circuit 22 is actually incorporated in the controller 4.

The main relay 26 is of a so-called normally open type that allows electrical conduction between two contacts 26a, 26b (closes the two contacts) as long as the main relay is supplied with the electric power (as long as an electromagnetic coil for closing the contacts is energized) and that opens the two contacts when the supply of electric power is cut off. The interlock circuit 22 is configured to open the main relay 26 when any one of three switching transistors Tr1, Tr2, and Tr3 is switched off. The interlock circuit 22 is supplied with a voltage (12V) from the sub-battery 2. A 12V source voltage line Acc applies a voltage to respective sources of the switching transistors Tr1, Tr2 and Tr3 via a switch 29 and also supplies the source voltage to the main relay 26 by serially connecting three sub-relays 23, 24, 25. The switch 29 is a switch operatively associated with an ignition key. When a user of the vehicle turns on the ignition key, the switch 29 is also energized simultaneously. The three sub-relays 23, 24, 25 are also of the normally open type. The sub-relays are supplied with the electric power from the sub-battery 2 via respective drains D1, D2, D3 of the switching transistors Tr1, Tr2 and Tr3. While the three sub-relays 23, 24, 25 are closed, the electric power is supplied to the main relay 26, which closes the two contacts 26a, 26b thereby allowing the electric power to be supplied from the main battery 15 to the controller 4. When any one of the sub-relays is opened, the power supply to the main relay 26 is shut down and the electric power supply path from the main battery 15 to the controller 4 is cut off.

An operation of each switching transistor is described. The switching transistor Tr1 and peripherals thereof are configured to turn off when the power supply from the sub-battery 2 is cut off. The switching transistor Tr1 has a gate G1 connected to the source voltage line Acc of the sub-battery 2 via a resistance for voltage adjustment. While being supplied with the electric power from the sub-battery 2, the switching transistor Tr1 is ON and hence, the drain D1 thereof is at a voltage equal to a source voltage Vacc. The electric power is supplied to the sub-relay 23 via the drain D1 so that the sub-relay 23 closes the contacts thereof (allows electrical conduction between the two contacts of the sub-relay 23). When the supply of source voltage Vacc is cut off, the voltage at the gate G1 drops to turn off the switching transistor Tr1. Then, the voltage at the drain D1 falls to the ground potential so that the power supply to the sub-relay 23 is also cut off. At this time, the two contacts of the sub-relay 23 are opened, cutting off the power supply to the main relay 26. As a result, the main relay 26 opens the two contacts 26a, 26b, cutting off the power supply path between the main battery 15 and the controller 4.

The switching transistor Tr2 and peripherals thereof are configured to turn off when a keep-alive signal 2 outputted from another device falls to a LOW potential (ground potential). A keep-alive signal 1 outputted from still another device/circuit is connected to a gate G2 of the switching transistor Tr2. The keep-alive signal 1 is outputted from, for example, a motor abnormality detection circuit (not shown) for detecting an abnormality of the motor (namely, a drive power source). While not detecting any abnormality of the motor, the motor abnormality detection circuit retains the keep-alive signal 1 at a predetermined voltage level (e.g., 5V) to keep the switching transistor Tr2 ON. Upon detection of an abnormality of the motor, the motor abnormality detection circuit drops a voltage of the keep-alive signal 1 to the ground level. While the switching transistor Tr2 is ON, the drain D2 is maintained at the source voltage Vacc and the sub-relay 24 keeps the two contacts thereof closed. When the switching transistor Tr2 is turned OFF, the potential of the drain D2 falls to the ground level so that the sub-relay 24 opens the two contacts thereof. As a result, the main relay 26 opens the two contacts 26a, 26b, cutting off the electric power supply path between the main battery 15 and the controller 4.

The switching transistor Tr3 and peripheral circuits thereof are also configured the same way as the switching transistor Tr2 and the peripherals thereof. While the keep-alive signal 2 is maintained at a predetermined potential, the two contacts of the sub-relay 25 (the main relay 26) are closed so that the electric power supply path from the main battery 15 to the controller 4 is established. When the potential of the keep-alive signal 2 falls to the ground level, the two contacts of the sub-relay 25 (the main relay 26) are opened, cutting off the electric power supply path from the main battery 15 to the controller 4. The keep-alive signal 2 is outputted from, for example, an engine abnormality detection circuit for detecting an abnormality of the engine (namely, the drive power source).

As described above, the interlock system 21 is adapted to cut off the electric power supply path from the main battery 15 to the controller 4 when the power supply from the sub-battery 2 is cut off or when an abnormality of the motor/engine is detected. When the switching transistor Tr1 and the peripherals thereof are disabled, namely the power supply from the sub-battery 2 to the interlock circuit 22 is cut off, the interlock system 21 of the first embodiment cuts off the electric power supply path from the main battery 15 to the controller 4. The keep-alive signals 1, 2 may also be outputted from other devices that are linked to each other to open the main relay 26.

The main relay 26 is interposed in the power cable 61a connecting the positive electrode of the main battery 15 to the positive electrode of the controller 4. The power cable 61b connecting the negative electrode of the main battery 15 to the negative electrode of the controller 4 is also connected to the ground. Since the controller 4 is always connected to the ground level, the potential of the controller 4 is maintained at the ground level when the main relay 26 is opened. This ensures the safety of the worker.

Description is made on a lower part of the controller 4 shown in FIG. 7. The controller 4 is provided with the three output terminals 28 for connection of the power cables to the motor 19. The three output terminals 28 correspond to the U-phase, V-phase, and W-phase cables for three-phase alternating current, respectively. The output terminals 28 are covered by the terminal cover 16.

As described above, the vehicle 100 has the layout (the layout of the sub-battery 2 and the controller 4) in which the terminal cover 16 covering the high-voltage terminals 28 cannot be removed without removing the sub-battery 2. The vehicle 100 further includes the interlock system that cuts off the electric power supply path from the main battery 15 to the controller 4 when the wire connection with the sub-battery 2 is removed. As understood from the above description, this interlock system is implemented in quite a simple structure. Furthermore, this interlock system obviates the need for mounting a device/structure such as a switch to the terminal cover.

Second Embodiment

Figure 8:
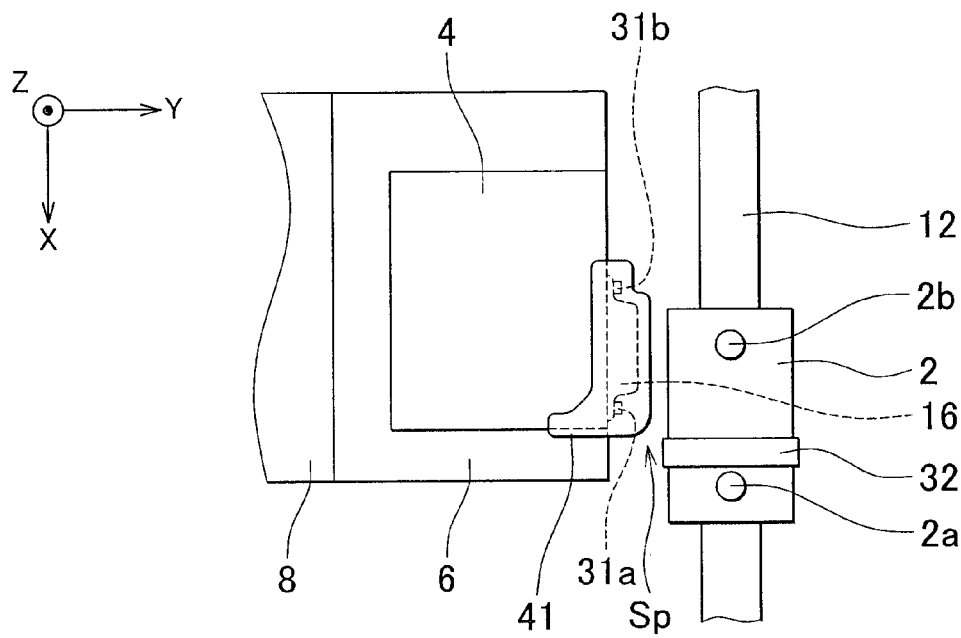
FIG. 8 is a plan view showing a layout of a controller and a sub-battery according to a second embodiment of the invention.
Figure 9:
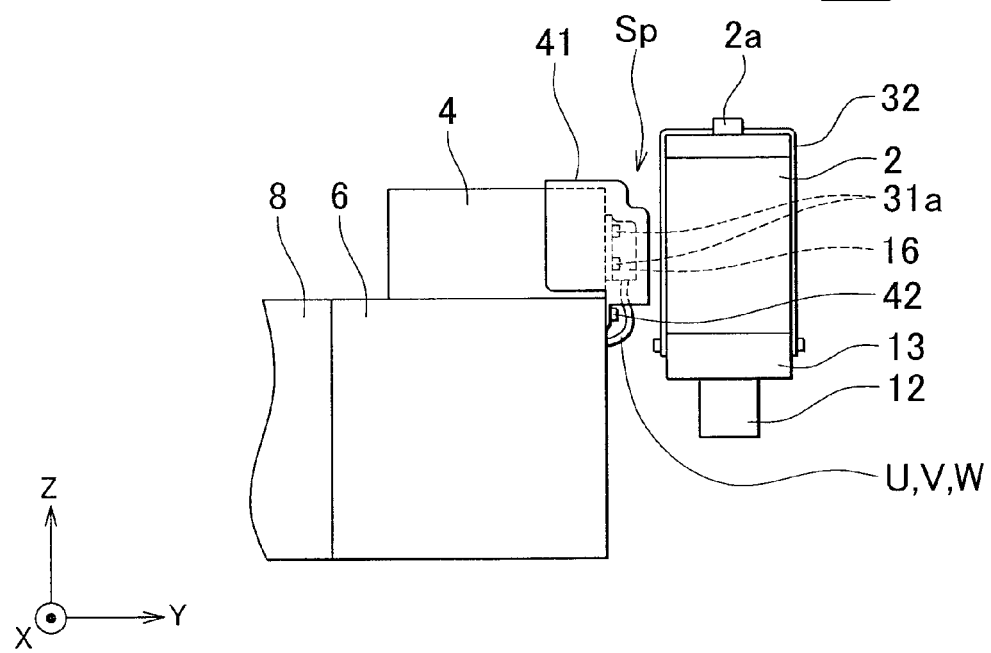
FIG. 9 is a front view showing the layout of the controller and the sub-battery according to the second embodiment.
Figure 10:
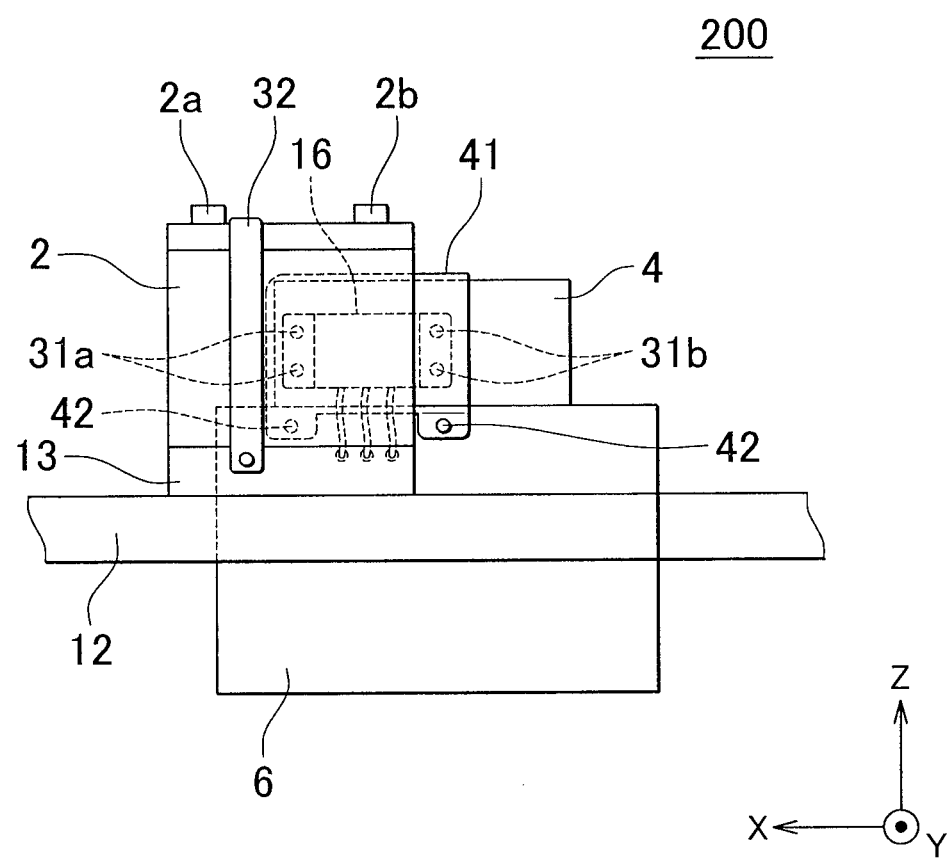
FIG. 10 is a side view showing the layout of the controller and the sub-battery according to the second embodiment.

FIG. 8 to FIG. 10 shows a layout of the controller 4 and the sub-battery 2 in a vehicle 200 according to a second embodiment of the invention. FIG. 8 shows a plan view of the layout. FIG. 9 shows a front view of the layout and FIG. 10 shows a side view of the layout. The vehicle 200 differs from the vehicle 100 of the first embodiment in that the controller 4 is provided with a protector 41 for absorbing impact on the controller 4 in the event of a vehicle collision or the like. The structure of the controller 4 (the positions of the output terminals 28 and the terminal cover 16), the layout of the controller 4 and the sub-battery 2 and the configuration of the interlock system are the same as those of the vehicle 100 of the first embodiment. Similarly to the vehicle 100, the vehicle 200 is also adapted to cut off the power supply path from the main battery to the controller 4 in response to the removal of the wire connection with the output terminals of the sub-battery 2. The interlock system and the like of the vehicle 200 are the same as those of the vehicle 100 and hence, the description thereof is dispensed with. FIG. 8 to FIG. 10 do not depict the parts (output terminals 28) inside the terminal cover 16 for the purpose of enhancing the clarity of the drawings.

The protector 41 is made of a metal sheet and covers a corner of the controller 4 that includes the terminal cover 16. As shown in FIG. 9 and FIG. 10, the protector 41 is fixed to the drive train 6 with two bolts 42. A space Sp between the protector 41 and the sub-battery 2 is so narrow that at least the front bolt 42 cannot be removed without removing the sub-battery 2. In the vehicle 200, the protector 41 cannot be removed without removing the sub-battery 2 and the terminal cover 16 cannot be removed without removing the protector 41. In other words, the sub-battery 2 is laid out in a manner to interfere with the removal of the protector 41 while the protector 41 is laid out in a manner to interfere with the removal of the terminal cover 16.

The preferred embodiments of the invention have been described. Followings are the important points about the embodiments. The technique disclosed herein may also be preferably applied to a terminal cover that is mounted to the controller and covers the input terminal for connection with the power supply cable from the main battery. That is, the sub-battery may be mounted at such a place as to interfere with the removal of the terminal cover for covering the input terminal of the controller.

The embodiments employ the bolts as a fastening member that fixes the terminal cover. Besides the bolt, the fastening member may be snap-fit retainers, clips and belts. For example, an embodiment may have a structure in which the terminal cover is made of resin and formed with claws at ends of the terminal cover and in which the claws are fitted in a groove formed in the controller 4. In this case, the sub-battery is disposed at such a place as to hide the claws of the terminal cover.

FIG. 7 shows an example of the interlock circuit and the invention is not limited to this. The interlock circuit may be implemented in the simplest form in which the output terminal of the sub-battery is directly connected to the electromagnetic coil of the main relay. However, it is preferred that the output terminal of the sub-battery is connected to the electromagnetic coil of the main relay at least via a switch operatively associated with the ignition switch. In such an embodiment, the main relay establishes disconnection between the main battery and the controller in response to the removal of the wire connection with the output terminal of the sub-battery. Namely, the path for supplying the high-voltage electric power to the controller is cut off by the removal of the sub-battery.

In a case where the output voltage of the main battery matches an input voltage of the inverter, the controller 4 may not include the DC-DC converter. Further, the controller 4 may also include a switching semiconductor for the inverter (power semiconductor), or a control board for controlling the module thereof.

The technique disclosed herein may preferably be applied not only to hybrid vehicles but also to pure electric vehicles including fuel cell vehicles.

While the specific examples of the invention have been described in detail, these examples are intended for purposes of illustration only and are not intended to limit the scope of the appended claims. The techniques disclosed in the appended claims include various modifications and changes of the specific examples illustrated in the foregoing. The technical components illustrated herein or in the accompanying drawings may be used alone or in various combinations to deliver technical utilities and hence, the use thereof is not limited to the combinations set forth in the claims of the present application. Further, the techniques illustrated herein or in the accompanying drawings can achieve a plurality of objects at a time. Achieving one of these objects per se constitutes the technical utility.

The invention claimed is:

1. An automobile comprising:
a controller configured to control a motor for driving the automobile;
a main battery configured to supply electric power to the motor via the controller;
a relay interposed in an electric power supply path extending from the main battery to the controller, the relay configured to be normally open; and
a sub-battery configured to supply electric power to the relay, the controller provided with an input terminal that connects with a power supply cable from the main battery or an output terminal that connects with a power supply cable to the motor, the controller mounted with a terminal cover that covers the input terminal or the output terminal, and the sub-battery disposed adjacent to the controller to interfere with a removal of the terminal cover.

2. The automobile according to claim 1, wherein the sub-battery is disposed so as to overlap with a fastening member that fixes the terminal cover to the controller.

3. The automobile according to claim 1, further comprising a protector covering the terminal cover,
wherein the sub-battery is disposed adjacent to the controller to interfere with a removal of the protector.

4. The automobile according to claim 1, wherein the controller is fixed to a drive train, and
the sub-battery is fixed to a frame of the automobile.

5. The automobile according to claim 1, wherein the sub-battery is disposed on one side of a drive train and an engine is disposed on the opposite side of the drive train.

6. The automobile according to claim 1, further comprising an interlock circuit in which the relay is turned off by a removal of the sub-battery,
wherein the interlock circuit is configured to turn off the relay upon detection of an abnormality of a drive power source for the automobile.

\* \* \* \* \*